United States Patent [19]
Clark et al.

[11] Patent Number: 6,073,163
[45] Date of Patent: *Jun. 6, 2000

[54] METHOD AND APPARATUS FOR ENABLING WEB-BASED EXECUTION OF AN APPLICATION

[75] Inventors: S. Mark Clark, Fremont; Timothy Eicher, Belmont; Philip Kuhn, Half Moon Bay, all of Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,777

[22] Filed: Jun. 10, 1997

[51] Int. Cl.$^7$ .................................................. G06F 13/00
[52] U.S. Cl. ............................. 709/203; 709/206
[58] Field of Search .................................. 709/202, 203, 709/205, 206, 208; 345/335

[56] References Cited

U.S. PATENT DOCUMENTS

| | | | |
|---|---|---|---|
| 5,293,619 | 3/1994 | Dean | 395/682 |
| 5,568,645 | 10/1996 | Morris et al. | 395/200.33 |
| 5,673,403 | 9/1997 | Brown et al. | 345/335 |
| 5,696,901 | 12/1997 | Konrad | 395/200.33 |
| 5,701,461 | 12/1997 | Dalal et al. | 707/4 |
| 5,706,502 | 1/1998 | Foley et al. | 380/4 |
| 5,745,703 | 4/1998 | Cejtin et al. | 395/200.68 |
| 5,754,830 | 5/1998 | Butts et al. | 395/500 |
| 5,761,421 | 6/1998 | van Hoff et al. | 395/200.53 |
| 5,790,664 | 8/1998 | Coley et al. | 380/4 |
| 5,796,952 | 8/1998 | Davis et al. | 395/200.54 |
| 5,815,709 | 9/1998 | Waldo et al. | 395/683 |
| 5,832,264 | 11/1998 | Hart et al. | 395/683 |
| 5,861,883 | 1/1999 | Cuomo et al. | 345/326 |
| 5,875,335 | 2/1999 | Beard | 395/705 |

FOREIGN PATENT DOCUMENTS 0 733 969 A1  9/1996  European Pat. Off. .

OTHER PUBLICATIONS

Dictionary of Computers, Information Processing & Telecommunications, 1987, pp. 23–24.

X Windows System (Robert W. Scheifler & James Gettys) pp. xxiv–28, 1992.

Merle, P., et al., "CorbaWeb: A generic object navigator", Computer Networks and ISDN Systems, vol. 28, No. 11, May 1996.

Primary Examiner—Paul R. Myers
Attorney, Agent, or Firm—Hickman Palermo; Truong & Becker, LLP; Edward A. Becker

[57] ABSTRACT

A method and system for executing an application at a client are described. An application is divided into portions. A first portion of code for the application is transmitted to the client over a network. The first portion of code is executed at the client to cause the client to generate a user interface that is displayed by the client, detect user interaction with the user interface, and transmit from the client over the network messages that indicate the user interaction with the user interface. A second portion of code for the application is executed at a node of the network other than the client. The second portion of code causes the node on which it is executing to respond to user interface messages from the client by (1) generating records that indicate changes to the user interface, and (2) transmitting the records to the first portion of code. The first portion of code responds to the messages by performing the specified changes to the user interface.

25 Claims, 5 Drawing Sheets

METHOD AND APPARATUS FOR ENABLING WEB-BASED EXECUTION OF AN APPLICATION

FIELD OF THE INVENTION

The present invention relates to computer systems and, more specifically, to database applications in client/server network systems.

BACKGROUND OF THE INVENTION

Database applications are applications with which a user interacts to insert and retrieve data from a database. The database applications perform database operations by submitting commands to a database server that has access to the desired database. The database server executes the commands received from database applications by interacting with the database and returning any requested data to the database applications.

Like all software programs, database applications are constantly undergoing improvements and revisions. For a user to be able to use a new version of a database application, a database application developer must deliver the new version of the application to the user, and the user must install the new version of the database application on the user's computer systems.

Software installation is an error-prone process, and can become even more complicated if the installation must be performed on multiple platforms. Even when the installation goes smoothly, the upgrade process may expend a significant amount of time and effort of both the database application developer and the end-user of the database application. If problems are encountered during the delivery or installation, the amount of time and energy required by the upgrade may increase exponentially.

Recently, database applications have been developed which operate as "plug-ins" to web-browsers. As will be discussed in greater detail hereafter, web-browsers are programs which request and decode information sent from servers that participate in the World Wide Web. Plug-ins consist of platform-specific code that is dynamically linked into a web browser to extend the capabilities of a web browser. Similar to other forms of database applications, database applications implemented as plug-ins must be delivered to and installed at each client computer.

As database applications become more sophisticated, they tend to become larger. Consequently, they require user computer systems to have more persistent storage for storing the applications, and more dynamic storage for executing the applications. Thus, the conventional upgrade process for database applications is at odds with the trend toward smaller, less expensive computer systems. For example, network computers, which generally have no persistent storage and relatively little dynamic storage, would not be capable of using the most sophisticated conventional database applications.

One way to avoid the installation process associated with upgrading a database application, and to reduce the resources consumed thereby, is to develop the database application using the X-Windows system. With X-Windows, software packages are installed onto a server to which clients are connected through a network. The server is responsible for both application processing, and for refreshing the screen area of the client computers when the screen area needs to be repainted. Unfortunately, the fact that X-Windows systems execute all code on the server results in significant disadvantages. For example, X-Windows systems tend to generate a significant amount of traffic over the network because even the code that generates the screen displays is executed at the server. Further, any processing capabilities of the client machines go unused, and are therefore wasted.

To both take advantage of the processing capabilities of the client computers and avoid some of the problems associated with delivering database application code to each client, a file-sharing approach may be used. In a file-sharing based system, the database application code exists on a file server, and the database application is installed on each client computer by delivering the database application code from the file server to the client over the network. Because the applications are installed locally on each client, the applications take advantage of the client's computational power during execution. However, the applications installed over a network tend to consume the client's resources while running in the same manner as they would if manually installed at each client computer. In addition, upgrades still require a separate per-client installation process.

Based on the foregoing, it is clearly desirable to provide a mechanism that allows users to execute sophisticated database applications that do not consume large amounts of client-side resources. It is further desirable to provide a mechanism which allows users to use upgraded versions of a database application without incurring the hassle associated with installing the new versions on the client's computer systems. It is further desirable to provide a mechanism that allows database application developers to distribute upgraded versions of application programs without incurring the expense of conventional delivery mechanisms.

It is also desirable to provide a technique that allows relatively low-resource computers, such as network computers, to use sophisticated database applications. It is further desirable to provide techniques that allow existing applications to be executed in a web environment without having to rewrite the code for the applications.

SUMMARY OF THE INVENTION

A method and system for executing an application at a client are provided. According to the method, a first portion of code for the application is transmitted to the client over a network. The first portion of code is executed at the client to cause the client to generate a user interface that is displayed by the client, detect user interaction with the user interface, and transmit from the client over the network a first message that indicates the user interaction with the user interface.

A second portion of code for the application is executed at a node of the network other than the client. The second portion of code causes the node on which it is executing to respond to the first message by (1) generating, based on the user interaction, at least one record that indicates a change to the user interface, and (2) transmitting the at least one record to the first portion of code in a second message. The first portion of code responds to the second message by performing the change to the user interface.

According to one aspect of the invention, the step of generating at least one record includes the step of generating a plurality of records which specify a plurality of changes to the user interface. The plurality of changes are accumulated by the second portion of code prior to transmitting the second message. The plurality of records are then sent in the second message.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for delivering a database application to a user is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
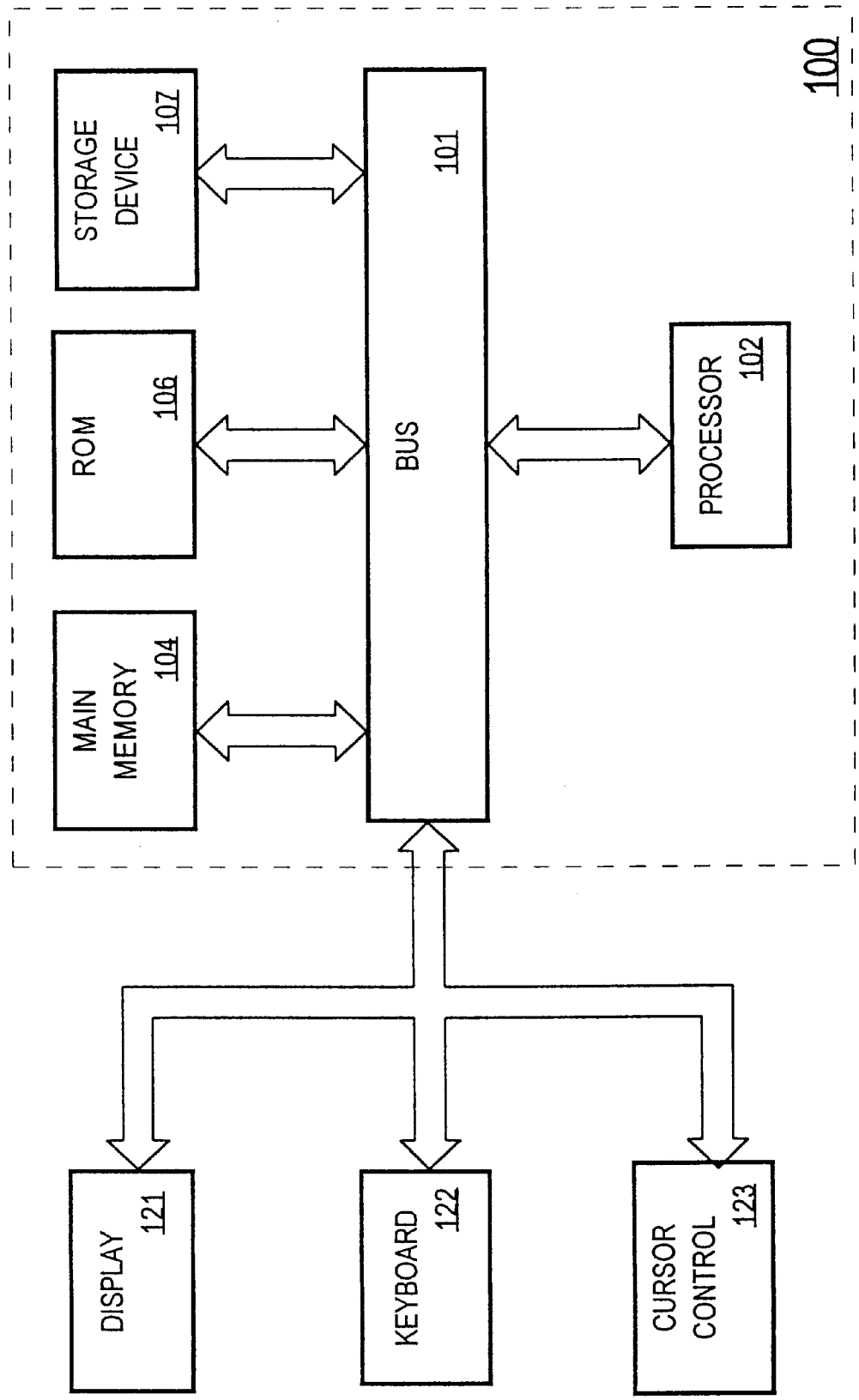
FIG. 1 is a block diagram of a computer system on which an embodiment of the present invention may be implemented.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to deliver a database application to a user. According to one embodiment, a database application is delivered to a client system by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

According to one aspect of the invention, the problems associated with installing database applications on client machines are avoided by delivering database application code to the client computer systems at run-time.

According to one embodiment, database application code is stored on a server to which each client has access over a network. The network may be a local area network, a wide area network, an intra-net, or the Internet. When a client desires to execute the database application, the client sends a message to the server that is responsible for delivering the code of the database application. In response to the message from the client, the server transmits database application code to the client. The client then executes the code to run the database application.

To reduce the network traffic generated during the process of delivering and executing the application program, portions of the database application code are only supplied as needed. Consequently, time and bandwidth are not wasted in the transport of code portions that will not be used. In addition, the database application functions are divided into server-executed functions and client-executed functions. Because the code for the server-executed functions remains at the server, traffic between the client and server is reduced. However, because the client-executed functions are executed at the client, the computational resources of the client are not wasted.

As shall be described in greater detail below, the division between the client-executed functions and the server-executed functions is such that code responsible for generating visual output is executed at the client, while code responsible for database management is executed at the server. Consequently, the data associated with visual output, which is relatively high volume, is generated locally at the client and therefore does not have to be transmitted over the network.

EXEMPLARY NETWORK SYSTEM

The World Wide Web includes a network of servers on the Internet ("web servers"), each of which has one or more HTML (Hypertext Markup Language) pages. The HTML pages on a web server provide information and hypertext links to other documents on that and (usually) other web servers. Web servers communicate with clients by using the Hypertext Transfer Protocol (HTTP).

Users of the World Wide Web use a client program, referred to as a browser, to request, decode and display information from a selected web server. When the user of a browser selects a link, a request is sent over the Internet to the web server that stores information specified in the link. In response to the request, the web server transmits the specified information to the browser that issued the request. The browser receives the information, presents the received information to the user, and awaits the next user request.

In addition to static HTML pages, web servers are able to transmit software code to the client. Depending on the form of the code and the capabilities of the web browser, the web browser may be able to execute the software code as it arrives from the web server. For example, some web browsers are able to execute JAVA byte code as it arrives from a web server. Such web browsers are said to be "JAVA-enabled". The process executed by a web browser in response to receiving JAVA byte code is referred to as a JAVA Applet.

The present invention is not limited to any particular type of network or any particular type of code. However, for the purpose of explanation, the invention shall be described with reference to an embodiment in which the Internet is the network over which the client-executed code is delivered, and the client-executed portion of the database application is delivered as a JAVA Applet in JAVA byte code to a client running a JAVA-enabled web browser.

SYSTEM ARCHITECTURE

Figure 2:
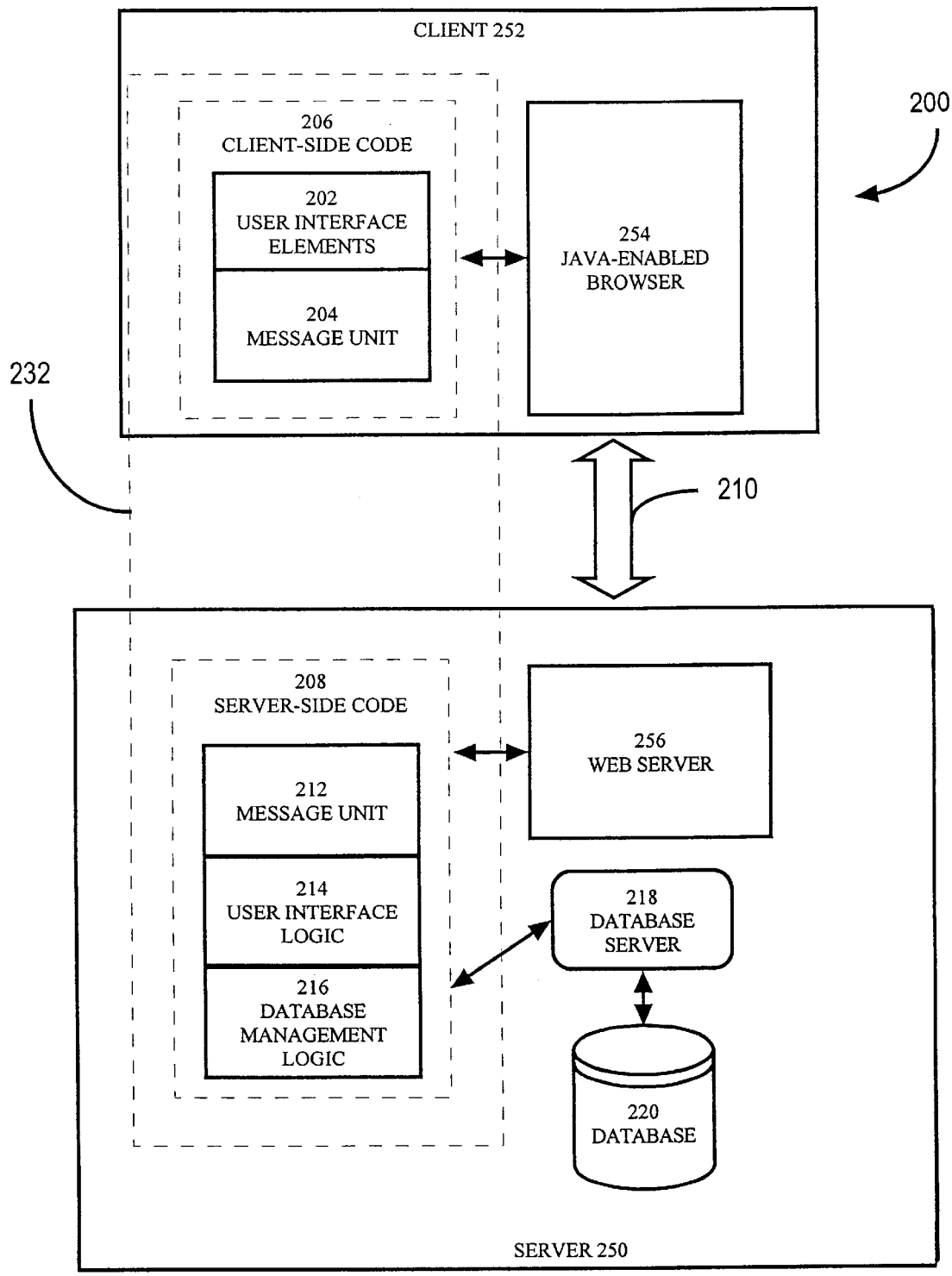
FIG. 2 is a block diagram of a client server/system configured to implement an embodiment of the invention.

FIG. 2 is a block diagram illustrating a system 200 for the runtime-delivery of a database application to a client according to an embodiment of the invention. System 200 generally includes a client 252 and a server 250. The client 252 communicates with the server 250 over a network connection 210.

Client 252 is executing a JAVA-enabled browser 254. Server 250 is executing a web server 256 and a database server 218. The database server 218 has access to a database 220. It should be noted that while the embodiment illustrated in FIG. 2 shows web server 256 and database server 218 executing on the same machine, they may alternatively be executing on separate machines.

A database application 232 includes client-side code 206 and server-side code 208. Client-side code 206 is written in JAVA byte code and is delivered from server 250 to client 252 over network connection 210. JAVA-enabled browser 254 executes the client-side code 206 as a JAVA Applet using the computational resources of the client 252. The client-side code 206 includes user-interface elements 202 and a message unit 204.

Client-side code 206 includes code associated with user interface elements 202 and a message unit 204. User interface elements 202 includes code for generating the graphical user interface objects that will be displayed to the user. Such graphical user interface objects include, for example, fields, pushbuttons, scrollbars and dialog windows.

Server side code 208 resides and executes on the server 250. Server side code 208 includes a message unit 212, user interface logic 214, and database management logic 216. User interface logic 214 includes the code that determines how the database application 232 will behave when the user interacts with the user interface elements 202. For example, user interface logic 214 determines the navigation sequence, performs declarative and programmatic field and record validation, and handles general user interface event processing common to all database applications. User interface logic 214 also handles trigger processing related to user interface events.

Such user interface events may include: Key-xx (function key is pressed), When-mouse-xx (User input entered through the mouse), and When-validate-xx (validations on user-entered data to ensure data integrity). These triggers are part of the application code and are specific to the particular application. For example, an application might have a when-mouse-click trigger that will perform a particular action or set of actions when the mouse is clicked. A different application might have a different when-mouse-clicked trigger, or might not have one at all. If no trigger for a particular action/event is in the application code, then the default behavior occurs.

Database management logic 216 handles the interaction between the database application 232 and the database server 218 with which the database application 232 is interacting. Consequently, database management logic 216 includes routines for record management, database interaction, and trigger processing.

Trigger processing may include: ON-xx (code to handle insert, update, delete and query), When-Validate-xx (code to handle validations to ensure data integrity), and Pre/Post-xx (code to be performed before and after each insert, update or delete operation). These triggers, like the ones above, are part of the application code, and are used to define behaviors such as what happens when the user goes to a new record, or tries to commit data to the database.

Message units 204 and 212 provide routines that allow the client-side code 206 and the server-side code 208 to communicate with each other over the network connection 210. As shall be explained hereafter, message unit 204 provides routines which allow the code for the user interface elements 202 to receive messages that specify changes to the user interface ("UI change messages") from the server-side code 208, and to transmit messages that indicate user interface events ("UI event messages") to server-side code 208. Conversely, message unit 212 provides routines which allow the user interface logic 214 to receive UI event messages from client-side code 206, and to transmit UI change messages to the client-side code 206.

EXEMPLARY OPERATION

Figure 3:
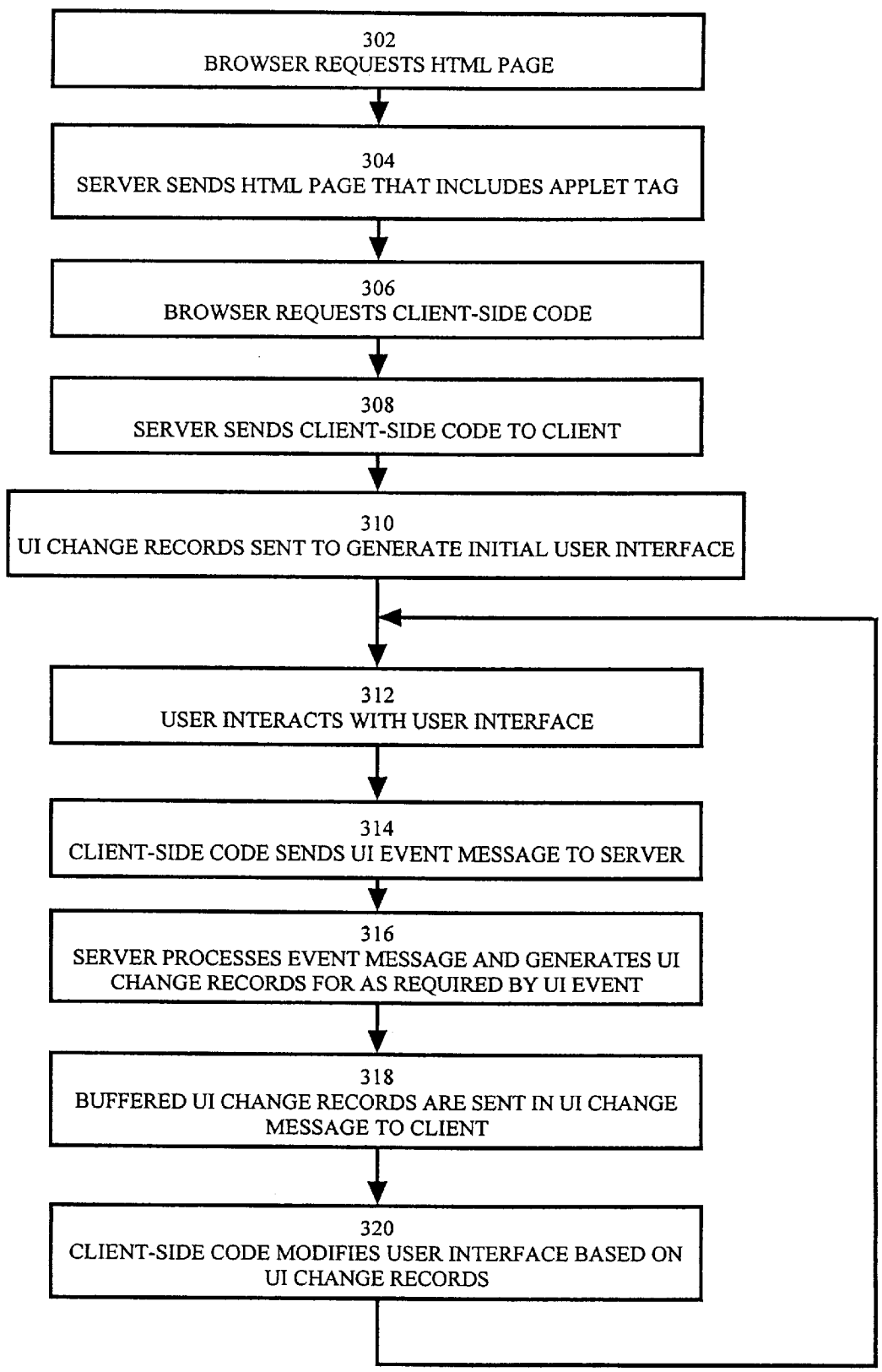
FIG. 3 is a flow chart illustrating steps for executing a web-delivered application according to an embodiment of the invention.

The operation of system 200 shall now be described with reference to the FIGS. 2 and 3. Initially, no component of database application 232 is installed on client 252. Because client 252 is not required to have any component of database application 232 pre-installed, client 252 need not have any writeable persistent memory. For example, client 252 may be a network computer that loads JAVA-enabled browser 254 from Read Only Memory to Random Access Memory at startup.

At startup, the JAVA-enabled browser 254 transmits a message to web server 256 requesting a default HTML document (step 302). The message transmitted from the JAVA-enabled browser 254 identifies the HTML document by an identifier, generally referred to a Universal Record Locator (URL). The web server 256 responds by transmitting the specified HTML document to the JAVA-enabled browser 254 (step 304). Upon receiving the document, the JAVA-enabled web browser 254 decodes the HTML document.

In the present example, it shall be assumed that the HTML document has code which, when decoded by JAVA-enabled browser 254, causes JAVA-enabled browser 254 to request the transmission of the client-side code 206 (step 306). For example, the HTML document may contain a tag in the form of <applet cl arg>, where "applet" is a flag for JAVA-enabled browser 254 to request the delivery of a JAVA Applet, "cl" identifies the object class that implements the JAVA Applet, and "arg" represents any arguments that are required to initialize the JAVA Applet.

In response to receiving the JAVA Applet request from JAVA-enabled browser 254, web server 256 transmits to client 252 the client-side code 206 (step 308). Upon receiving client-side code 206, the JAVA interpreter within JAVA-enabled browser 254 begins executing client-side code 206. When executed, client-side code initializes the client-side, and puts the client-side into a state where it can handle user interface change messages from the server. The first set of user interface change messages that the client side receives from the server define the initial user interface to be displayed on the display device of client 252 (step 310).

During execution, client-side code 206 and server-side code 208 communicate with each other in a series of requests and responses. Specifically, requests are transmitted from client-side code 206 to server-side code 208 in the form of UI event messages, or requests for specific data. Responses from the server-side code 208 typically take the form of UI change messages which may specify changes to displayed values or may add or remove user interface components from the display.

The server-side code 208 maintains information relating to the UI objects that have been created at the client. Thus, when the server-side code receives a UI event message that a particular button has been pressed, the server-side code is aware of the particular button and can therefore determine the action to be taken in response to the button being pressed.

For example, assume that a user selects a menu item on a menu displayed by client-side code 206 (step 312). Selection of the menu item in question may specify the generation of a particular form that contains data from database 220. However, the logic that determines how to respond to the selection of the menu item is located within the server-side code 208. Consequently, the client-side code 206 transmits a UI event message to server-side code 208 that simply identifies the particular menu item that was selected (step 314).

In response to receiving the UI event message from the client-side code 206, the server-side code 208 determines what actions must be taken. In the present example, the database management logic 216 may have to issue database commands to database server 218 to retrieve data from database 220 to be displayed in the requested form. While the server-side code 208 is processing the UI event message received from the client-side code 206, the server-side code 208 generates UI definition records that indicate how the user interface of the client must be changed in response to the requested operation (step 316). A UI definition record may specify, for example, "create a green text-field on canvas app_cnvl". The UI definition records are buffered in the server 250 while the server-side code is processing the UI event message.

When the server-side code 208 finishes processing, buffers within the server 250 will contain UI definition records that indicate how the user interface at the client should be changed to reflect the results of the operation. The UI definition records are then bundled into a UI change message and transmitted over the network to the client-side code 206 (step 318). According to one embodiment, the UI change messages are encoded to ensure they are as small as possible, thereby reducing the amount of network traffic generated during the execution of database application 232.

Upon receiving a UI change message, the client-side code 206 translates UI definition records contained in the UI change message to actual user interface objects and causes the objects to be displayed to the user (step 320). In the present example, the client-side code 206 will actually create and display a green text-field on canvas app_cnvl.

Once the specified form is displayed at the client 252, the user may interact with the form, thereby causing the request-response process (steps 312 to 320) to be repeated. For example, assume that a user changes an employee bonus to "5000.00" in form "BON1 Form", and then clicks in a field "EMP.ENAME" associated with employee names. Also assume that the BON1 Form includes a When-Validate-Item trigger that displays an alert when a bonus amount is raised above $2,000, where the alert asks the user if the user really wants to make the change.

In the present example, the client-side code 206 may transmit a UI event message to the server-side code 208 with the following information:
Form BON1 Item EMP.BONUS Row 1
 Value 5000.00
Form BON1 Item EMP.ENAME Row 1
 FocusRequest The server-side code 208 will process this request and determine what actions must be taken. In the present example, the server-side code 208 will determine that the appropriate alert must be displayed, and that the format of the value entered by the user should be corrected. While processing the request, the server-side code 208 generates and buffers UI definition records that specify changes to what is being displayed to the client. The UI definition records are then sent to the client-side code 206 in a UI change message. In the present example, the UI change message sent to the client-side code 206 may contain the following information:
Form BON1 Item EMP.BONUS Row 1
 Value $5000.00
Form BON1 Alert USER_ALERT
 Btn1 "Yes"
 Btn2 "No"
 Message "Are you sure?"
 Dflt 1

Upon receiving the UI change message, the client-side code 206 translates the UI definition records to cause the specified changes to the user interface. In the present example, the client-side code 206 changes the unformatted value "5000.00" to the formatted value "$5000.00", and causes an alert to appear asking if the user wishes to perform the change. Assuming that the user selects the "Yes" button on the alert, the client-side code 206 sends the request:
Form BON1 Alert USER_ALERT
 Press Btn1
And the server-side code 208 responds with:
Form BON1 Item EMP.ENAME Row 1
 FocusSet When a user is done using the database application 232, the memory used by the client-side code 206 may be de-allocated and used for other purposes. Thus, the database application 232 does not leave any residual components on the client, and therefore does not consume any client resources when not in use.

CLIENT-SIDE DISPATCHER

Figure 4:
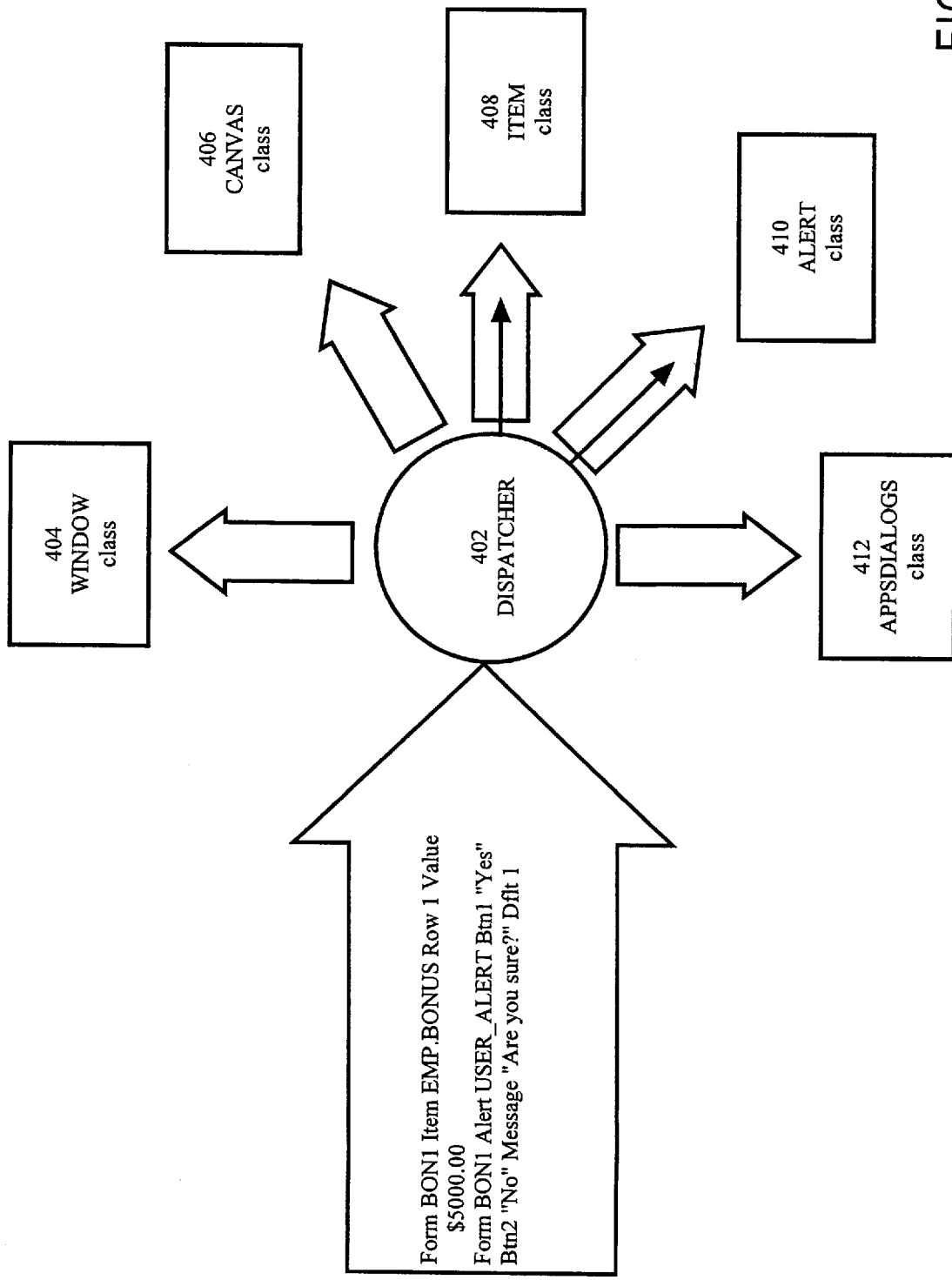
FIG. 4 is a block diagram of a dispatcher that may be used in the client-side portion of an application according to an embodiment of the invention.

According to one embodiment of the invention, the client-side code 206 includes a dispatcher 402, as illustrated in FIG. 4. The dispatcher 402 receives the UI definition records and dispatches them by invoking the appropriate methods of the appropriate UI classes. FIG. 4 illustrates server-side code 206 that includes a window class 404, canvas class 406, item class 408, alert class 410 and AppsDialogs class 412. Each of these classes invokes the code associated with a different class of user interface object. In the illustrated example, the dispatcher 402 is receiving a UI change message that specifies a change to an item object and a change to an alert object. In response to the UI change message, the dispatcher 402 will invoke the appropriate methods of the item class 408 and alert class 410.

According to an embodiment of the invention, the class code for all types of UI classes is designed with the same programming interface. For example, the Button, Text Field and Window classes all include the methods: On_Register, On_Create, On_Update, On_Get, and On_Destroy. Each UI definition record sent to the dispatcher 402 is in the following format: Message_Type, Class_ID, Instance_ID, and Property_List, where the Message_Type parameter specifies one of the common methods. Each item in the Property_List is in the form: Property_ID, Property_Type, Property_Value.

By designing the UI classes with the same programming interface, the dispatcher 402 is able to dispatch messages to UI classes without having any special knowledge about the specific UI classes. This allows applications to be upgraded with new classes of interface objects without requiring the application developer to make corresponding changes to the dispatcher 402.

For example, assume that a first version of an application uses two-dimensional buttons. While a user is using the first version of the application, the dispatcher 402 loads and dispatches messages to the code for the two-dimensional button class. If a second version of the application uses three-dimensional buttons, the dispatcher 402 will load and dispatch messages to the code for the three-dimensional button class in the same manner as it did to the two-dimensional button class without any modification.

One technique for ensuring that all UI classes with which dispatcher 402 will operate support the same programming interface is to define an abstract UI class that specifies the common interface but does not provide any implementations for the methods. All UI classes that are to be used in the server-side code 206 are then defined as subclasses of the abstract UI class. As subclasses, the specific UI classes will inherit the interface of the abstract UI class, but supply the implementation code specific for their specific class.

AS-NEEDED CLIENT CODE TRANSFER

In the explanations given above, it is assumed that the complete client-side code 206 is transferred to the client 252 when the database application 232 is initiated. However, the various components of the client-side code 206 may alternatively be loaded on an as-needed basis. For example, the code for dispatcher 402 may be transmitted to the client 252 when application 232 is initiated. When the dispatcher 402 first receives a UI definition record that specifies the creation of a window, the code for window class 404 has not yet been transmitted to the client 252. Consequently, dispatcher 402 tells the JAVA interpreter within web browser 254 that the code for the window class must be loaded. In response, the web browser 254 transmits a message to server 250 to cause the code for window class 404 to be sent to client 252. When the code for window class 404 arrives, the dispatcher 402 invokes the appropriate method of window class 404 to cause the window class 404 code to create the window specified in the UI definition record.

Because the components of client-side code 206 are transmitted to client 252 on an as-needed basis, certain components may not have to be sent during a particular session. For example, if the user never performs an operation that triggers the display of an alert message, then the code for alert class 410 will never be sent to the client 252.

EXEMPLARY MESSAGE SEQUENCE

Figure 5:
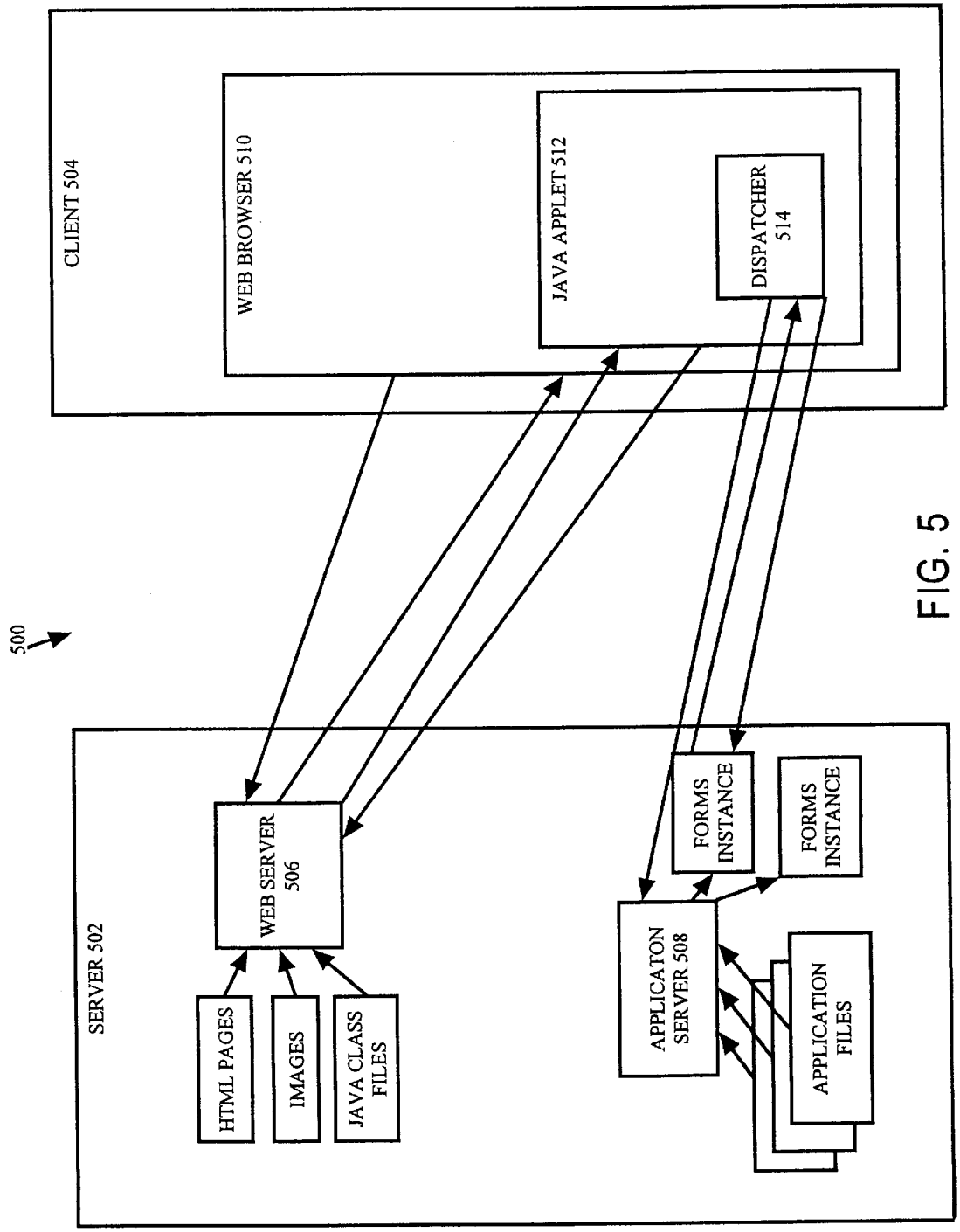
FIG. 5 is a block diagram of a network system in which an application is executed using a JAVA Applet that communicates with server-side code according to an embodiment of the invention.

FIG. 5 is a block diagram of a network system 500 illustrating the sequence of messages between a client 504 and a server 502 according to an embodiment of the invention.

Initially, a web browser 510 executing on the client sends a request to a web server 506 running on server 502. In the request, the web browser 510 includes a URL that identifies an HTML page. Web server 506 responds to the request by sending the specified HTML page to the web browser 510. The HTML page will contain a tag that indicates that the HTML file includes a JAVA Applet 512.

The web browser 510 decodes and displays the HTML file. Upon detecting the tag, the web browser 510 invokes a JAVA interpreter within the web browser 510 to execute the JAVA Applet 512. The JAVA tag indicates where to get the code for the JAVA Applet, and how much screen space will be dedicated to the Applet. The web browser 510 then requests the Applet code from the web server 506.

The web server 506 initially sends the code for dispatcher 514. When the code for dispatcher 514 arrives, the code is executed by the JAVA interpreter. Upon execution, dispatcher 514 indicates to the JAVA interpreter the data that the dispatcher 514 immediately needs from web server 506 to begin execution. The data initially required by dispatcher 514 may include, for example, code associated with particular user interface classes, such as buttons, as well as image data required to display those user interface classes.

The JAVA interpreter within browser 510 requests the specified information from web server 506. The web server 506 responds by sending the requested information to web browser 510. Web browser 510 supplies the information to the JAVA Applet 512, and Dispatcher 514 invokes the necessary code.

When the user interacts with the user interface generated by Applet 512, the Applet 512 generates a UI event message, as described above. The UI event message is transmitted to an application server 508. In the illustrated embodiment, application server 508 is responsible for managing the server-side code for multiple applications. Therefore, application server 508 initially determines which application is associated with JAVA Applet 512. When the appropriate application has been determined, application server 508 causes the server-side code of the appropriate application to begin executing on the server.

According to one embodiment, the server-side code of an application is multi-threaded. Consequently, the same instance of the server-side code may be used for multiple JAVA Applets, each of which may be concurrently executing on different clients. In embodiments where the server-side code of the application is not multi-threaded, a separate instance of the server-side code is executed for each Applet associated with the application. In the illustrated example, Applet 512 is associated with the "Forms" application, and the application server 508 has initiated execution of a server-side "Forms Instance." The UI event message received from Applet 512 is passed to the appropriate Forms Instance.

The Forms Instance determines how to respond to the user input specified in the UI event message. While processing the UI event message, the Forms Instance generates UI definition records, as described above. The set of UI definition records generated in response to the user input is then sent back to dispatcher 514 in a UI change message. Dispatcher 514 dispatches the UI definition records within the UI change message to the appropriate UI objects. If any of the UI definition records require a UI class that has not yet been loaded onto client 504, the dispatcher 514 causes the web browser 510 to request the necessary object class code from the web server 506. The UI object code that resides within Applet 512 then processes the UI definition records by performing the UI-related operations specified therein.

CLIENT-SIDE OPERATIONS

In the embodiments described above, a limited number of operations may be performed at the client 252 without any interaction with the server-side code 208. For example, user actions which operate solely within the user interface, such as typing a series of characters into a text field, is handled purely within the client-side code 206. Further, the operation of common dialogs are able to operate completely within the client 252 until the user performs a high level operation, such as "accepting" or "canceling" the dialog. Other user actions, such as changing a checkbox or inter field navigation, require the server-side code 208 to be notified of the relevant changes so that appropriate trigger processing may occur.

According to an alternative embodiment of the invention, the client-side code 206 includes a subset of the user-interface logic that allows more actions to be performed at the client 252 without any communication with the server-side code 208. For example, client-side code 206 may include code for handling some of (1) the navigation sequence of the user interface elements, (2) the declarative and programmatic field and record validation, and (3) the UI related trigger processing. The client-side trigger processing may implement triggers written in JAVA or another scripting language, for example.

MULTI-SERVER CONFIGURATIONS

In the embodiment illustrated in FIG. 2, the server-side code 208 resides on the same server 250 as the web server 256 that sends the client-side code 206 to the client 252. However, the server-side code 208 may alternatively reside on a different server. When the server-side code 208 resides on a different server than the server that delivers the client-side code 206, special measures must be taken if the client-side code 206 is delivered as a JAVA Applet.

Specifically, the current security model for JAVA Applets prohibits communications between an Applet and any host other than the host from which the Applet was downloaded. To accommodate this restriction, the host from which the Applet is downloaded may execute a proxy agent that redirects requests for service to the server on which the server-side code 208 is executing.

NETWORK TRANSPORT

Various mechanisms may be used to transport data across the network during the communications between the client-side code 206 and the server-side code 208. For example, one embodiment of the invention may use direct TCP/IP socket communications. When direct TCP/IP socket communications are used, the client-side code 206 establishes a permanent TCP/IP socket communication with the server-side code 208 after the client-side code 206 is initiated. All information requests, or responses, are transmitted through the socket connection. Using direct TCP/IP socket communications is particularly effective for communication within an Intranet where no internal network firewalls are present. A connection established in this way should be able to re-establish itself should the network fail for a short period of time, or if the client-side code 206 and server-side code 208 become accidentally disconnected.

Alternatively, HTTP with CGI/Cartridge support may be used to transport data between the client-side code 206 and the server-side code 208. In an embodiment that uses HTTP, the client-side code 206 sends an HTTP request to the originating web server 256 whenever the client-side code 206 wishes to communicate with the server-side code 208. When the client-side code 206 receives a response from the server-side code 208, the client-side code 206 disconnects from the network. The use of HTTP is desirable when the server containing the server-side code 208 resides behind a firewall, since most firewalls will not permit arbitrary socket traffic to pass.

According to one embodiment of the invention, the server-side code 208 includes a time-out mechanism that detects when a socket connection has been inactive for more than a predetermined period of time. When the time-out period has been exceeded, the server-side code 208 removes the connection. The conditions that trigger a time-out may be configured by a site administrator.

Using the techniques described herein, the burden placed on the user of a database application is significantly reduced. For example, the user need not purchase client systems with large resource reserves, since the client systems need not persistently store any components of the database application. The user is also free to purchase any mixture of client platforms, since all such platforms will be able to execute the client-side code as long as they include a JAVA-enabled browser.

The burden on an application developer is also reduced. Specifically, the application developer need only install an upgraded version of the database application on the server to effectively deliver upgrades at all of the clients. The client need not even be aware that an upgrade occurred.

In addition, network traffic is reduced by executing at the client-side the code responsible for generating the visual components to be displayed to the user. Once the client-side code is delivered, the only traffic required during execution of the application involves relatively compact event messages and UI change messages. A further benefit to executing the UI-related code at the client is that doing so takes advantage of the processing capabilities of the client. The traffic between the client and server is further reduced by incorporating into the client-side code some of the UI-related logic to allow certain user operations to be handled exclusively at the client.

In addition, the techniques described herein allow existing applications to be executed in a web environment without changing the bulk of the existing code. Specifically, the user interface code common to all applications is implemented in a machine-independent language such as JAVA so that it can be executed on any types of clients. However, the bulk of the application code (relating to the logic of the application) may remain in code that compiles to platform-specific format, since the specific platform on which the code will be executed is known.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing an application at a client, the method comprising the steps of:

transmitting a first portion of code for the application to the client over a network; executing said first portion of code at said client to generate a user interface comprising one or more user interface objects that is displayed by said client, wherein each user interface object has attributes that are independent of any data used to populate the user interface;

detect user interaction with said user interface; and generate and transmit from said client over said network a first message that indicates said user interaction with said user interface;

executing a second portion of code for the application at a node of said network other than said client, said second portion of code responding to said first message by performing the steps of:

determining how the attributes of at least one of the one or more user interface objects are to be changed in response to the detected user interaction with the user interface;

generating, based on said user interaction indicated by the first message, at least one record that indicates one or more changes to be made to the attributes of the at least one of the one or more user interface objects in response to the detected user interaction with the user interface; and transmitting said at least one record to said first portion of code in a second message;

said first portion of code responding to said second message by performing the one or more changes to the attributes of the at least one of the one or more user interface objects indicated by the at least one record.

2. The method of claim 1 wherein:

the step of generating at least one record comprises the step of generating a plurality of records which specify a plurality of changes to be made to the attributes of the one or more user interface objects;

said plurality of changes are accumulated by said second portion of code prior to transmitting said second message; and the step of transmitting said second message comprises the step of sending said plurality of records in said second message.

3. The method of claim 1 wherein:

the step of transmitting a first portion of code for the application to the client over a network includes transmitting the first portion of code for the application from a first server on the network;

the second portion of code resides on a second server that is different than said first server; and the first message is transmitted to said second portion of code through a proxy agent that resides on said first server.

4. The method of claim 3 wherein the second message is transmitted from said second portion of code to said first portion of code through said proxy agent that resides on said first server.

5. The method of claim 1 further comprising the steps of:

said first portion of code detecting that the change to the attributes of the at least one of the one or more user interface objects requires code that does not yet reside on said client;

said first portion of code generating a third message over said network to cause said code to be transmitted to said client over said network; and when said code arrives at said client, invoking said code to cause the one or more changes to be made to the attributes of the at least one of the one or more user interface objects.

6. The method of claim 1 wherein:

a request for execution of the application is generated by a JAVA-enabled browser executing on said client; and the method includes the step of transmitting said first portion of code to said client as a JAVA Applet.

7. The method of claim 1 wherein:

the step of executing said first portion of code at said client comprises executing code that governs generation of the one or more user interface objects of said application at said client; and the step of executing said second portion of code at a node of said network other than said client comprises the step of executing code which governs changing the attributes of the one or more user interface objects at said node of said network other than said client.

8. The method of claim 1 wherein the step of performing the one or more changes to the attributes of the at least one of the one or more user interface objects comprises the steps of:

executing on said client a dispatcher that invokes methods of a plurality of user interface object classes based on said second message;

changing the attributes of the at least one of the one or more user interface objects in response to executing said methods; and wherein each of said plurality of user interface object classes supports a common programming interface and said dispatcher interacts with said user interface object classes through said common programming interface.

9. The method of claim 1 further comprising the step of:

detecting a request for execution of the application at the client; and wherein the step of transmitting the first portion of code for the application to the client over the network is performed by a server on the network in response to receiving the request at the server.

10. Computer-readable media having stored thereon a first portion of code and a second portion of code for executing an application at a client:

said first portion of code including instructions which, when executed at said client, cause said client to perform the steps of:

generating a user interface comprising one or more user interface objects that is displayed by said client, wherein each user interface object has attributes that are independent of any data used to populate the user interface;

detecting user interaction with said user interface; and generating and transmitting from said client over a network a first message that indicates said user interaction with said user interface;

said second portion of code including instructions which, when executed at a node of said network other than said client, cause said node to respond to said first message by performing the steps of:

determining how the attributes of at least one of the one or more user interface objects are to be changed in response to the detected user interaction with the user interface;

generating, based on said user interaction indicated by the first message, at least one record that indicates one or more changes to be made to the attributes of the at least one of the one or more user interface objects in response to the detected user interaction with the user interface; and transmitting said at least one record to said first portion of code in a second message;

wherein executing said first portion of code further causes said client to respond to said second message by performing the one or more changes to the attributes of the at least one of the one or more user interface objects indicated by the at least one record.

11. The computer-readable media of claim 10 wherein:
the step of generating at least one record comprises the step of generating a plurality of records which specify a plurality of changes to be made to the attributes of the one or more user interface objects;
said plurality of changes are accumulated by said second portion of code prior to transmitting said second message; and
the step of transmitting said second message comprises the step of sending said plurality of records in said second message.

12. The computer-readable media of claim 10 wherein:
the first portion of code for the application is transmitted to the client from a first server on the network;
the second portion of code resides on a second server that is different than said first server; and
the first message is transmitted to said second portion of code through a proxy agent that resides on said first server.

13. The computer-readable media of claim 12 wherein the second message is transmitted from said second portion of code to said first portion of code through said proxy agent that resides on said first server.

14. The computer-readable media of claim 10 wherein:
said first portion of code includes instructions for detecting that the change to the attributes of the at least one of the one or more user interface objects requires code that does not yet reside on said client;
said first portion of code includes instructions for generating a third message over said network to cause said code to be transmitted to said client over said network and, when said code arrives at said client, invoking said code to cause the one or more changes to be made to the attributes of the at least one of the one or more user interface objects.

15. The computer-readable media of claim 10 wherein the first portion of code is a JAVA Applet.

16. The computer-readable media of claim 10 wherein:
said first portion of code governs generation of the one or more user interface objects of said application at said client; and
said second portion of code governs changing the attributes of the one or more user interface objects.

17. The computer-readable media of claim 10 wherein the step of performing the one or more changes to the attributes of the at least one of the one or more user interface objects comprises the steps of:
executing on said client a dispatcher that invokes methods of a plurality of user interface object classes based on said second message;
changing the attributes of the at least one of the one or more user interface objects in response to executing said methods; and
wherein each of said plurality of user interface object classes supports a common programming interface and said dispatcher interacts with said user interface object classes through said common programming interface.

18. The computer-readable media of claim 10 wherein:
a request for execution of the application at the client is detected at a server on the network; and
the first portion of code for the application is transmitted to the client over the network by the server in response to receiving the request at the server.

19. A system for executing an application comprising:
a client coupled to a network;
a server configured to transmit a first portion of code for the application to the client over the network;
said client executing said first portion of code to
generate a user interface comprising one or more user interface objects that is displayed by said client, wherein each user interface object has attributes that are independent of any data use to populate the user interface;
detect user interaction with said user interface; and
generate and transmit from said client over said network a first message that indicates said user interaction with said user interface;
a node of said network other than said client, said node being configured to execute a second portion of code for the application, said second portion of code causing said node to respond to said first message by performing the steps of:
determining how the attributes of the at least one of the one or more user interface objects are to be changed in response to the user interaction with the user interface;
generating, based on said user interaction indicated by the first message, at least one record that indicates one or more changes to be made to the attributes of the at least one of the one or more user interface objects in response to the user interaction; and
transmitting said at least one record to said first portion of code in a second message;
said first portion of code responding to said second message by performing the one or more changes to the attributes of the at least one of the one or more user interface objects indicated by the at least one record.

20. The system of claim 19 wherein:
said node generates a plurality of records which specify a plurality of changes to be made to the attributes of the one or more user interface objects;
said plurality of changes are accumulated by said second portion of code prior to transmitting said second message; and
the node sends said plurality of records in said second message.

21. The system of claim 19 further comprising a second server that is different than said server, wherein:
the second portion of code resides on the second server; and
the first message is transmitted to said second portion of code through a proxy agent that resides on said server.

22. The system of claim 21 wherein the second message is transmitted from said second portion of code to said first portion of code through said proxy agent that resides on said server.

23. The system of claim 19 wherein:
said first portion of code detects that the one or more changes to be made to the attributes of the at least one of the one or more user interface objects requires code that does not yet reside on said client;
said first portion of code generates a third message over said network to cause said code to be transmitted to said client over said network; and when said code arrives at said client, said code is invoked to cause the one or more changes to be made to the attributes of the at least one of the one or more user interface objects.

24. The system of claim 19 wherein:

a request for execution of the application is generated by a JAVA-enabled browser executing on said client; and said first portion of code is a JAVA Applet.

25. The system of claim 19 wherein:

said first portion of code includes code that governs generation of the one or more user interface objects of said application at said client; and the second portion of code includes code which governs changing the attributes of the at least one of the one or more user interface objects.

* * * * *